US005502828A

United States Patent [19]
Shah

[11] Patent Number: 5,502,828
[45] Date of Patent: Mar. 26, 1996

[54] REDUCING MEMORY ACCESS IN A MULTI-CACHE MULTIPROCESSING ENVIRONMENT WITH EACH CACHE MAPPED INTO DIFFERENT AREAS OF MAIN MEMORY TO AVOID CONTENTION

[75] Inventor: Salim A. Shah, Austin, Tex.

[73] Assignee: Advanced Micro Devices, Inc., Sunnyvale, Calif.

[21] Appl. No.: 993,005

[22] Filed: Dec. 18, 1992

[51] Int. Cl.$^6$ .................................................. G06F 12/08
[52] U.S. Cl. ........................... 395/403; 395/470; 395/473
[58] Field of Search ..................................... 395/400, 425, 395/403, 470, 473; 364/200 MS File, 900 MS File, DIG. 1, DIG. 2

[56] References Cited

U.S. PATENT DOCUMENTS

| | | | |
|---|---|---|---|
| 4,654,782 | 3/1987 | Bannai et al. | 364/200 |
| 5,210,843 | 5/1993 | Ayers | 395/425 |
| 5,398,325 | 3/1995 | Chang et al. | 395/425 |
| 5,404,489 | 4/1995 | Woods et al. | 395/425 |

FOREIGN PATENT DOCUMENTS 2193356  3/1988  United Kingdom.

OTHER PUBLICATIONS

IBM Technical Disclosure Bulletin, "Memory Management Mechanism to Reduce Cache–Line Contention", *Anonymous*, vol. 32, No. 8B, Jan. 1990, pp. 25–26.
Patent Abstracts of Japan, vol. 015, No. 122 (P–1184), Mar. 26, 1991, abstract of Ishida Itsuko et al., "Data Processor", Japanese 03 01–345, Jan. 17, 1991.
Computer Design, Warren Andrews, "New Cache Tags Bring Flexibility, Performance to Memory Subsystems", Jul. 1, 1990, pp. 42–46.
Computer Design, Ron Wilson, "Will the Search for the Ideal Memory Architecture Ever End?", Jul. 1, 1990, pp. 78–90.

*Primary Examiner*—Jack A. Lane
*Attorney, Agent, or Firm*—Foley & Lardner

[57] ABSTRACT

A cache control circuit reduces accesses of main memory in a multiple cache multiprocessing system. The circuit allows the use of multiple caches with a single central processing unit, and facilitates burst-mode operations.

1 Claim, 4 Drawing Sheets

REDUCING MEMORY ACCESS IN A MULTI-CACHE MULTIPROCESSING ENVIRONMENT WITH EACH CACHE MAPPED INTO DIFFERENT AREAS OF MAIN MEMORY TO AVOID CONTENTION

BACKGROUND OF THE INVENTION

A computer system would ideally use very fast memory for all of its temporary storage needs. This would allow the Central Processing Unit (CPU) to operate at its designed speed, without the need to wait for slower memory devices. However, slower memory is often used because it is less expensive, consumes less power, and provides more storage in a given space than does very fast memory.

A characteristic of most computer applications programs is that they tend to perform repetitive operations on the same or neighboring pieces of data. Cache memory systems take advantage of this characteristic by storing recently accessed data in a small amount of very fast memory, called cache memory. Data which is read from slower main memory is stored in the faster cache memory, so that if a program must subsequently use the same data, this data may be read from the cache memory. Thus, cache memory systems increase the apparent speed of memory accesses in computer systems.

A cache memory system must keep track of main memory addresses for which the data is available in the cache. When data is available in the cache, the main memory access is aborted in favor of cache access. This is called a cache "hit." The frequency of cache hits may be increased in many ways. One method is to use an algorithm for deciding which data to place in cache that is tailored to the particular computer application. Another method for increasing the frequency of hits is to use a larger cache memory.

The optimum amount of cache memory in a computer system depends on many factors, including the particular application, the target cost of the system, the hardware used in the system, and the relative costs of main and cache memory. Some systems may be optimized by using multiple smaller caches, rather than one large cache. For instance, multiple smaller caches may be mapped into non-contiguous blocks of memory.

A cache system which utilizes multiple cache memories must avoid contention interference between the caches. Contention occurs when more than one cache responds to a memory address with a cache hit.

Another problem may occur when a CPU utilizes a "burst-mode" operation. Burst-mode operations are performed on data in a sequential series of memory locations. Rather than have the CPU execute a new instruction to address each individual memory location, burst-mode allows the CPU to execute a single instruction specifying a starting memory address, an operation to be performed, and the length of the memory block on which to perform the operation. In such cases, the memory access is preferably done in burst-mode. This may cause special problems in a snooping multiple cache system when the starting memory address for a burst-mode operation starts in one cache and is completed in a different cache.

In a multiprocessing environment, the caches not only service their CPUs, but monitor memory bus access that is initiated by other memory bus masters. In a 'copy back' implementation, this activity is called bus snooping. Since data adherency is of paramount importance, the caches may have to stall their CPU's access in favor of the memory monitoring.

SUMMARY OF THE INVENTION

This invention discloses a method for screening the memory accesses and thereby freeing the cache to service their processor in multiple caches and a circuit which implements this method. Additional circuitry for performing burst-mode operations is further disclosed.

Contention is eliminated by mapping the individual caches into different areas of the physical address space of main memory. Circuitry in the individual cache memory implements the mapping function by permitting a range of addresses to be selected by the CPU, and then responding with the cache function only when an address within this range is placed on the main memory address bus.

Contention problems during burst-mode operations are avoided by circuitry in the cache which automatically steps through the memory addresses specified by the operation and decides whether these addresses correspond to the area mapped by the cache.

DETAILED DESCRIPTION OF THE PREFERRED EMBODIMENTS

Figure 1:
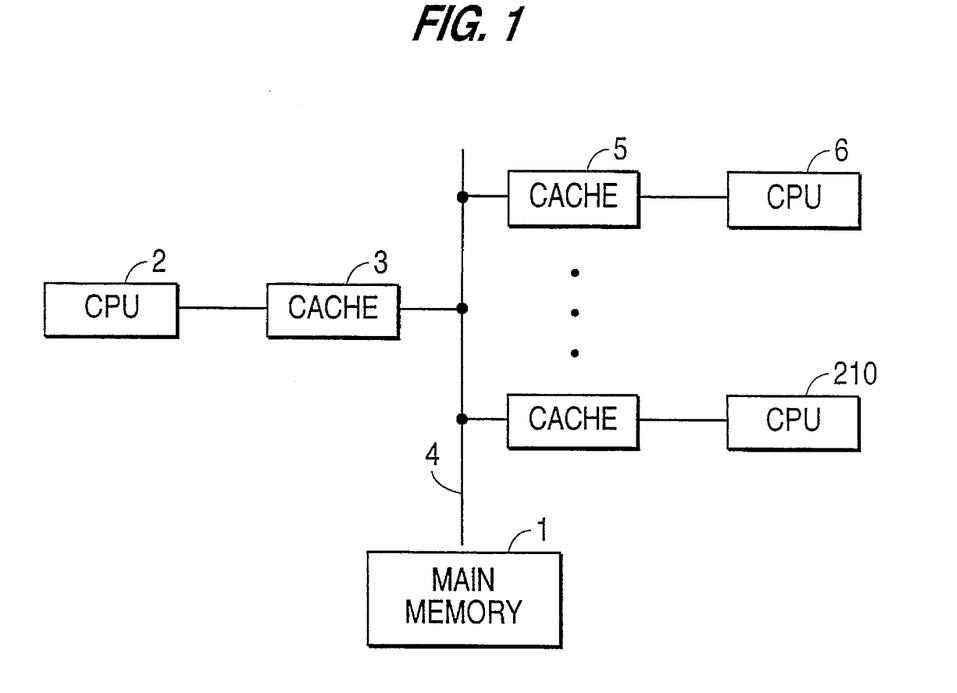
FIG. 1 shows a multiprocessing system with a common main memory and a separate cache for each CPU.

FIG. 1 shows a multiprocessing system with a shared main memory 1 where each CPU 2 has its own cache memory 3. In this system, the cache memory 3 serves not only to increase the speed of memory accesses, but also to reduce the level of contention on the main memory bus 4 for access to main memory 1. A CPU 2 in this system can directly access only its local cache 3, and not a cache 5 attached to another CPU 6.

Figure 2A:
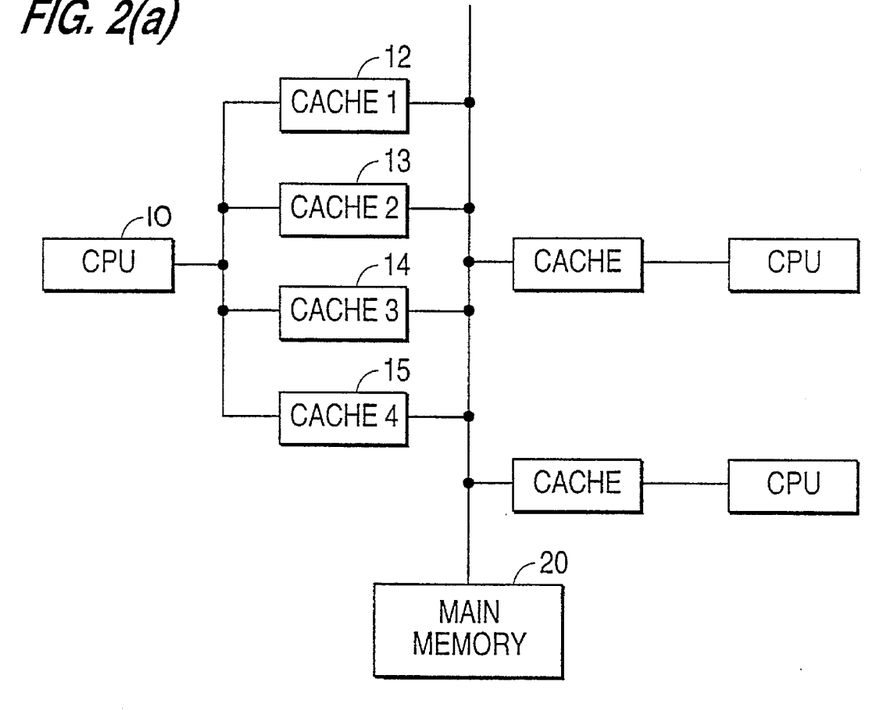
FIG. 2(a) shows a multiprocessing system with a common main memory and a CPU with multiple cache memories.
Figure 2B:
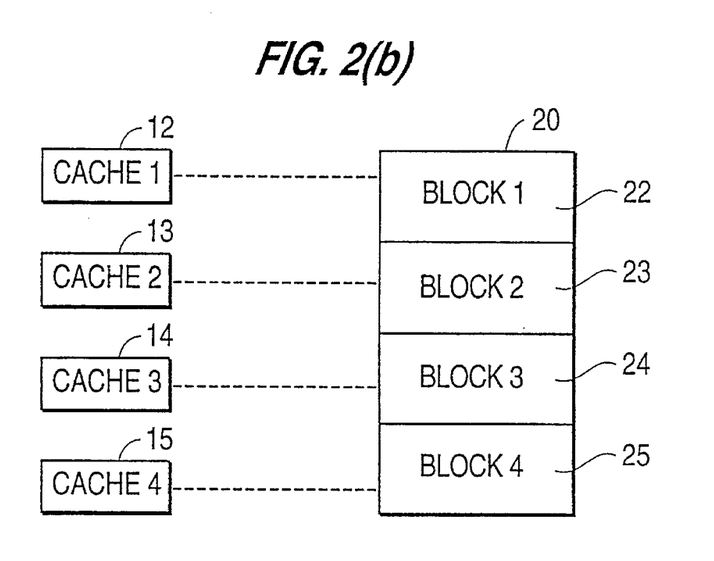
FIG. 2(b) shows multiple caches mapped to non-overlapping regions of main memory.

FIG. 2(a) shows a multiprocessing system which embodies the present invention wherein CPU 10 has multiple cache memories 12 to 15. A four-cache system is shown for explanation purposes only; this disclosure encompasses similar multi-cache systems using any number of caches. FIG. 2(b) is a representation of how a multiple cache system with four caches 12 to 15 is mapped into four blocks 22 to 25 of main memory 20. The four main memory blocks 22 to 25 are non-overlapping, and so are the four caches 12 to 15. Say the CPU 10 requests a memory access from main memory 20, circuitry in cache 12 to cache 15 snoop the physical address of the memory access request concurrently. If the physical address is within the mapped range for a particular cache, that cache examines its contents for a snoop hit. Since the caches are non-overlapping, only one cache can respond to the memory request, eliminating contention between the caches.

Figure 3:
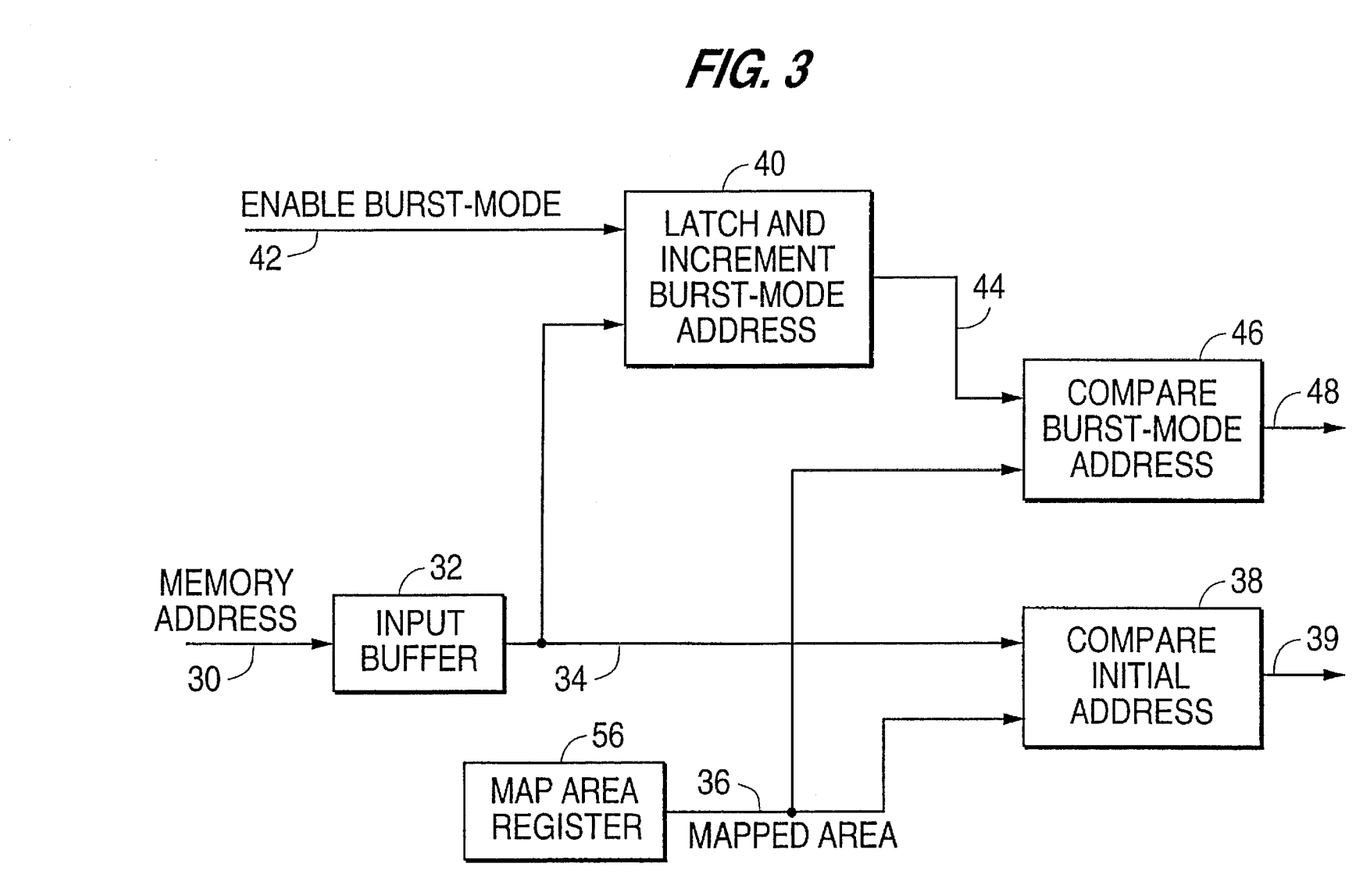
FIG. 3 is a block diagram of one embodiment of circuitry which prevents cache contention, thereby allowing implementation of a multi-cache system.

FIG. 3 is a block diagram of one embodiment of circuitry which prevents cache contention during initial and burst-mode memory accesses. A memory address 30 from the address bus passes through an input buffer 32 before being fed to the comparison circuitry. For an initial memory access, the buffered memory address 34 is compared with the mapped area 36 of the cache by comparator circuitry 38, producing a signal 39 when the buffered memory address 34 matches the mapped area 36 of the cache.

Referring back to FIG. 3, each of the cache memories contains a map area register (MAR) 56 which stores a memory address range for identifying a corresponding physical address space in the main memory.

Burst-mode operations send only the initial memory address 30, and not subsequent memory addresses. The subsequent memory addresses are generated by the burst circuitry 40 which latches and increments the buffered memory address 34. Burst circuitry 40 is enabled for the duration of the burst operation by burst-mode signal 42. Burst circuitry 40 generates a burst address 44 which is compared to the mapped area 36 of the cache by comparator circuitry 46, producing a signal 48 if the burst address 44 is within the mapped area 36 of the cache. When the burst-mode operation is complete, burst circuitry 40 is disabled by burst-mode signal 42.

Each cache is programmed with a unique mapped area 36 describing the physical address limits in which the cache operates. When memory access starts due to snooping, each cache employs a comparator circuit 38 to compare the memory address 30 to be accessed with the mapped area 36 for that cache. If the requested memory address 30 is within the range of addresses specified by the mapped area 36, then the circuitry proceeds with cache function. Otherwise, the circuitry does not respond to the memory request, thereby freeing its resources to service the CPU to which it is attached.

A burst-mode memory access may begin in one cache, but proceed into another cache. In this case, the burst-mode circuitry keeps track of the probability that the cache which was initially asked not to respond may be asked to respond as the addresses are processed. When the initial memory address 30 falls within the mapped area 36 of the cache, cache operation is enabled via signal 39. Subsequent burst addresses 44 which fall within the mapped area 36 will continue to enable cache operation via signal 48. However, when subsequent burst addresses 44 are outside the mapped area 36 of the cache, the cache operation will be disabled via signal 48, preventing contention with another cache which may have the burst address 44 within its particular mapped area 36.

One method of simplifying the circuit design of the comparator function 38 is to limit the scope of the mapped area 36 to an even power of two (i.e., 2, 4, 8 . . . 1024, 2048 . . . ), and require the mapped area 36 to start at an address which is either "0" or evenly divisible by the size of this mapped area. This implementation allows the comparator circuitry 38 to check only the higher-order bits of the buffered memory address 34 to determine whether it is within the range specified by the mapped area 36. This method may also be used by comparator circuitry 46.

Figure 4:
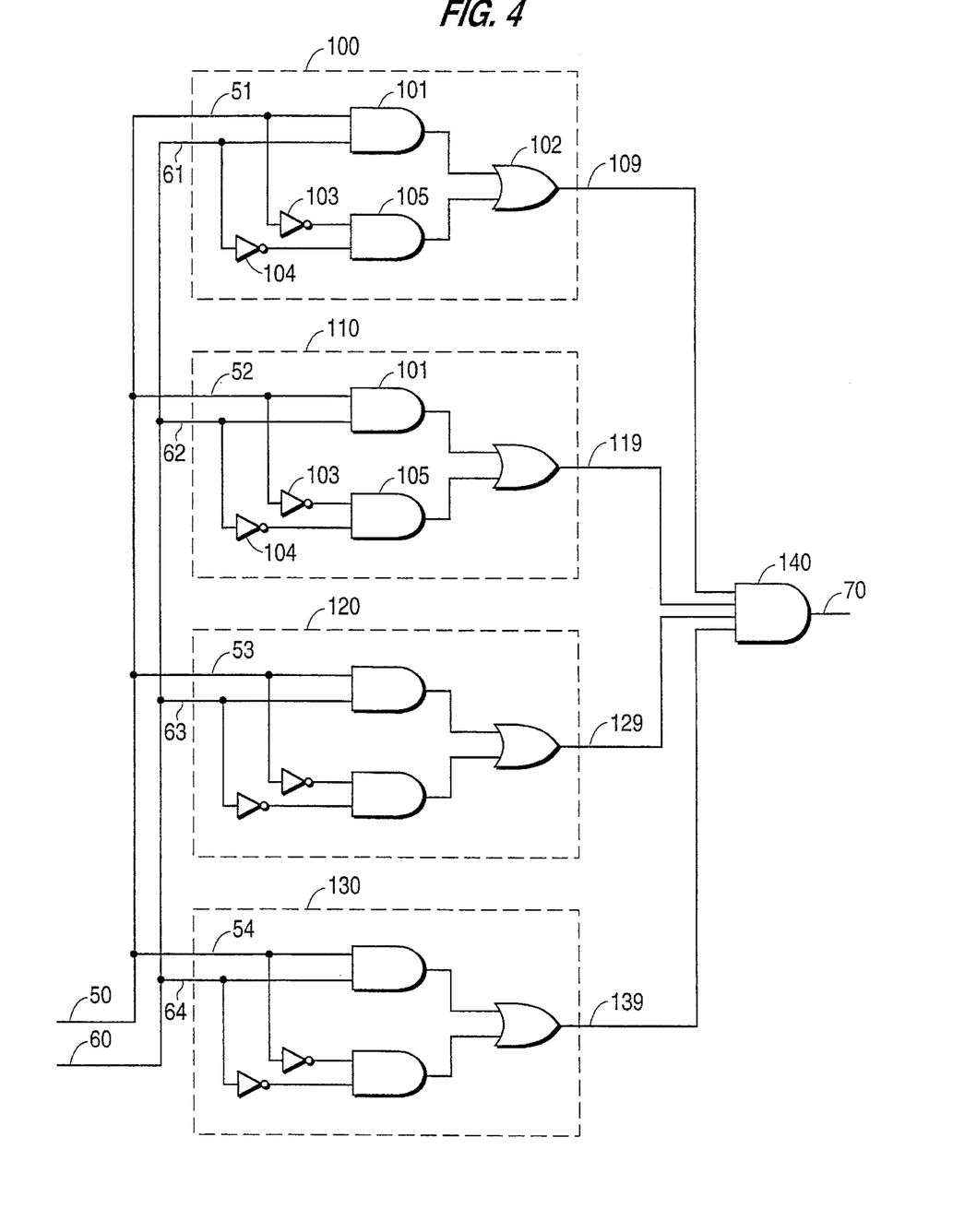
FIG. 4 is a diagram of one embodiment of the comparator circuitry which prevents cache contention in a multi-cache system.

An embodiment of the address comparison circuitry used in each cache is shown in FIG. 4. The implementation is shown for a system which allows up to 16 different caches, but the disclosure may be easily modified for other system requirements. The four high-order address bits 51 to 54 of the requested memory access are compared with the four map bits 61 to 64 which define the mapped area of the cache, and which are output from the MAR 56 of FIG. 3. If all of bits 51–54 equal bits 61–64, a high logic level "1" will be generated at the match output 70 of the circuitry. Otherwise the match output 70 will remain low, or "0".

The comparison circuit in FIG. 4 is composed of four comparator blocks 100, 110, 120, and 130. Each comparator block compares one bit of the requested address to one bit of the mapped area. For instance, address bit 51 is compared to map bit 61 in comparator block 110. If address bit 51 and map bit 61 are both "1", the output of AND gate 101 is "1" and the output 109 of OR gate 102 is "1". If address bit 51 and map bit 61 are both "0", inverters 103 and 104 will supply "1's" to the input of AND gate 105, causing a "1" to appear at the output 109 of OR gate 102. Therefore, the output 109 of comparator block 110 is "1" only if address bit 51 equals map bit 61.

The same analysis applies to the other comparator blocks. The output 119 of comparator block 110 is "1" only if address bit 52 equals map bit 62. The output 129 of comparator block 120 is "1" only if address bit 53 equals map bit 63. The output 139 of comparator block 130 is "1" only if address bit 54 equals map bit 64. The match output 70 of AND gate 140 is "1" only if address bits 51–54 equal map bits 61–64, causing each comparator block 100, 110, 120, and 130 to supply "1's" to the inputs 109, 119, 129, and 139 of the AND gate 140.

Referring to FIG. 2(a), each cache 12–15 contains the circuitry in FIG. 4. When each cache 12–15 is programmed with a different map address (bits 61–64 in FIG. 4), the caches 12–15 correspond to non-overlapping blocks 22–25 of main memory 20. For any given memory request, at most one cache 12–15 can respond with a high match output 70 (in FIG. 4). Therefore, there can be no contention between caches 12–15 servicing a memory access request from CPU 10.

It should be understood that there may be many ways in which the address comparison and cache mapping may be implemented by those skilled in the art. Various modifications may be made to this embodiment without departing from the scope of this invention as described in the following claims.

What is claimed is:

1. A cache memory system, comprising:

a first Central Processing Unit (CPU), said first CPU outputting a memory access request including a memory address;

a shared memory bus;

a main memory;

a plurality of cache memories connected to be directly accessible by said first CPU and connected to access said main memory through said shared memory bus, each of said cache memories having an associated memory address range indicating a range of addresses which are permitted to be stored in said each of said cache memories; and a second CPU with copy back, said second CPU having at least one associated cache memory connected to said main memory through said shared memory bus to carry out said copy back to said main memory, wherein each of said cache memories connected to said first CPU monitors an address of a memory access request transmitted over said shared memory bus to determine if said address on said shared memory bus lies within its associated memory address range, such that said each of said cache memories connected to said first CPU is accessed to search an address of said copy back only when said address of said copy back lies within said associated memory address range.

* * * * *

UNITED STATES PATENT AND TRADEMARK OFFICE
CERTIFICATE OF CORRECTION

PATENT NO. : 5,502,828
DATED : March 26, 1996
INVENTOR(S) : Salim A. SHAH

It is certified that error appears in the above-indentified patent and that said Letters Patent is hereby corrected as shown below:

Column 5, line 4, Claim 1, contains an error wherein "an" should read --a memory--.

Column 6, lines 2 and 3, "copy back" should read --memory access request--;

line 4, after "range" insert --, wherein each of said cache memories connected to said first CPU contains a map area register which holds said associated memory address range for identifying a corresponding physical address space in said main memory;

UNITED STATES PATENT AND TRADEMARK OFFICE
CERTIFICATE OF CORRECTION

PATENT NO. : 5,502,828
DATED : March 26, 1996
INVENTOR(S) : Salim A. SHAH

It is certified that error appears in the above-indentified patent and that said Letters Patent is hereby corrected as shown below:

wherein each of said cache memories connected to said first CPU contains a first comparison circuit connected to said map area register for comparing said memory address in said memory access request with said associated memory address range in said map area register, and for providing an output signal when said memory address is within said associated memory address range to initiate a cache memory access in response to said memory access request, wherein said memory address range held by said map area register for each of said cache memories directly connected to said first CPU corresponds to a set state of k signal lines, k being an integer greater than one, said first through kth signal lines being respectively set to corresponding first through kth predetermined logical states,

UNITED STATES PATENT AND TRADEMARK OFFICE
CERTIFICATE OF CORRECTION

PATENT NO. : 5,502,828        Page 3 of 5
DATED : March 26, 1996
INVENTOR(S) : Salim A. SHAH It is certified that error appears in the above-indentified patent and that said Letters Patent is hereby corrected as shown below:

wherein said memory address in said memory address request corresponds to a set state of i address lines, i being an integer greater than k, said first through ith address lines being respectively set to a corresponding first through ith logical state, said first address line corresponding to a highest order address bit of said memory address, and said ith address line corresponding to a lowest order address bit of said memory address, wherein said memory address request is within said memory address range when said first through kth predetermined logical states of said first through kth signal lines match first through kth predetermined logical states of first through kth address lines, and wherein said first comparison circuit for each of said cache memories connected to said first CPU includes,

UNITED STATES PATENT AND TRADEMARK OFFICE
CERTIFICATE OF CORRECTION

PATENT NO.   : 5,502,828                          Page 4 of 5
DATED        : March 26, 1996
INVENTOR(S)  : Salim A. SHAH It is certified that error appears in the above-indentified patent and that said Letters Patent is hereby corrected as shown below:

first through kth AND gates each having a first input port respectively connected to a corresponding one of said first through kth address lines, and each having a second input port respectively connected to a corresponding one of said first through kth signal lines;

first through kth NAND gates each having a first input port respectively connected to a corresponding one of said first through kth address lines, and each having a second input port respectively connected to a corresponding one of said first through kth signal lines;

first through kth OR gates each having a first input port respectively connected to an output port of a corresponding one of said first through kth AND gates and a second input port respectively connected to an output port of a corresponding one of said first through kth NAND gates; and

UNITED STATES PATENT AND TRADEMARK OFFICE
CERTIFICATE OF CORRECTION

PATENT NO.  : 5,502,828
DATED       : March 26, 1996
INVENTOR(S) : Salim A. SHAH It is certified that error appears in the above-indentified patent and that said Letters Patent is hereby corrected as shown below:

a k+1th AND gate having k input ports each respectively connected to an output port of a corresponding one of said first through kth OR gates, an output port of said k+1th AND gate providing the output signal of said first comparison circuit.--.

Signed and Sealed this

Fourth Day of March, 1997

*Attest:*

BRUCE LEHMAN

*Attesting Officer*      Commissioner of Patents and Trademarks